United States Patent [19]

Brow et al.

[11] Patent Number: 5,021,307

[45] Date of Patent: Jun. 4, 1991

[54] HIGH EXPANSION, LITHIUM CORROSION RESISTANT SEALING GLASSES

[75] Inventors: Richard K. Brow; Randall D. Watkins, both of Albuquerque, N. Mex.

[73] Assignee: The United States of America as represented by the United States Department of Energy, Washington, D.C.

[21] Appl. No.: 578,903

[22] Filed: Sep. 7, 1990

Related U.S. Application Data

[62] Division of Ser. No. 146,560, Jan. 21, 1988.

[51] Int. Cl.$^5$ ............................................. H01M 2/08
[52] U.S. Cl. .................................... 429/184; 429/144; 429/247

[58] Field of Search ........................ 429/144, 184, 247; 428/433

[56] References Cited

U.S. PATENT DOCUMENTS 4,687,717  8/1987  Kann et al. .......................... 429/152

Primary Examiner—Theodore Morris
Assistant Examiner—David M. Brunsman
Attorney, Agent, or Firm—Anne D. Daniel; James H. Chafin; William R. Moser

[57] ABSTRACT

Glass compositions containing CaO, $Al_2O_3$, $B_2O_3$, SrO and BaO in various combinations of mole % are provided. These compositions are capable of forming stable glass-to-metal seals with pin materials of 446 Stainless Steel and Alloy-52 rather than molybdenum, for use in harsh chemical environments, specifically in lithium batteries.

9 Claims, No Drawings

HIGH EXPANSION, LITHIUM CORROSION RESISTANT SEALING GLASSES

The U.S. Government has rights in this invention pursuant to Contract No. DE-AC04-76DP00789 between the U.S. Department of Energy and AT&T Technologies, Inc.

This is a division of application Ser. No. 146,460 filed Jan. 21, 1988.

BACKGROUND OF THE INVENTION

This invention relates to glass-to-metal seals and, more particularly, to glass-to-metal seals using glass compositions with high thermal expansion coefficients and good resistance to Li corrosion, and high expansion metal pin materials. These seals can be used for the glass-to-metal seals in components exposed to severe chemical environments, e.g. in headers for ambient temperature Li batteries.

Lithium ambient temperature batteries provide high energy densities and high rate capabilities, at low temperatures; however, a major problem associated with these cells is the highly corrosive nature of Li chemistry. Standard glass insulators, used to separate the body of a battery header from the center pin while providing a hermetic seal for the battery, experience extensive corrosion over relatively short periods of time, thus severely limiting the shelf life of the cells.

An additional problem associated with conventional Li batteries is the current use of molybdenum as the pin material for center pins in Li battery headers. Molybdenum is a difficult material to work with, being difficult to weld, difficult to machine as it is very brittle, and susceptible to aqueous corrosion. It is desirable to use alternative pin materials, instead of molybdenum. Replacement of molybdenum with more weldable, more machinable, and more chemically resistant alloys would improve both the ability to manufacture Li batteries and their ultimate performance. Improved pin materials for lithium batteries include Alloy-52 and 446 stainless steel. Alloy 52 is a Ni—Fe alloy also referred to as Niron 52; Niron 52 is described in Hawley, G. G., *The Condensed Chemical Dictionary, Tenth Edition*, Van Nostrand Reinhold Company, New York, New York, 1981, page 728, as the trademark for a magnetic alloy of 50% nickel and 50% iron, having the following properties: density of 8.46 gm/cm$^3$, and tensile strength of 70,000 psi. Alloy 52 or Niron 52 has a linear thermal expansion coefficient of $98 \times 10^{-7}/°C$. at room temperature to 500° C. The trademark 446 stainless steel is the AISI designation for a ferritic steel which is magnetic and non-heat treatable, having a linear thermal expansion coefficient of $114 \times 10^{-7}/°C$. at room temperature to 700° C.; also, 446 stainless steel is defined in Clauser, Henry R., *Encyclopedia/Handbook of Materials, Parts, and Finishes*, Technomic Publishing Company, Inc., Westport, Connecticut, 1976, pages 446–447, as a ferritic steel with 23–27% chromium content, 0.20 maximum % carbon content, and 0.25 maximum % nitrogen content, typically used in applications requiring high resistance to corrosion and oxidation.

In order to form an acceptable glass-to-metal seal in an ambient temperature Li battery, the glass must meet three main criteria. First, it must have a high resistance to Li corrosion; second, it must be able to make a hermetic seal between the metal header body and the metal center pin, which requires an expansion match between the glass and the pin; and, third, it must be an electrical insulator so that the header body and the center pin are electrically isolated.

The glass currently used in the glass-to-metal seal in headers for Li ambient temperature batteries is TA-23, which has a finite corrosion rate when in contact with Li metal. Although TA-23 glass resists Li corrosion well enough to project battery lifetimes out to 5–10 years, the finite corrosion rate limits the lifetime of the battery.

Glasses based on the $CaO—Al_2O_3—B_2O_3$ and $CaO—MgO—Al_2O_3—B_2O_3$ systems have been developed to improve the corrosion resistance and extend the battery lifetime. The most promising of these latter glasses is CABAL-12 which, like TA-23, is designed to have a thermal expansion coefficient that closely matches that of the molybdenum center pin, about $60 \times 10^{-7}/°C$. CABAL-12 has far superior corrosion resistance than TA-23, but all of the $CaO-Al_2O_3—B_2O_3$ and $CaO—MgO—Al_2O_3—B_2O_3$ glasses have limited thermal expansion coefficient ranges, on the order of $60–90 \times 10^{-7}/°C$., which makes them unsuitable for sealing to the high expansion, alternative metal, pin materials.

There is no previously established technology that describes hermetic, electrically insulating, glass-to-metal seals for Li batteries, using non-silicate sealing glasses and center pins of materials other than molybdenum.

There is an existing need for the development of such technology to allow the replacement of the molybdenum center pin, currently used in most commercial Li batteries, with alternative pin materials that are easier to weld, are easier to machine, and are less susceptible to aqueous corrosion.

Also, there is an existing need for the development of hermetic glass-to-metal seals for lithium-power supplies, using nonsilicate glasses, which resist attack by lithium at least as well as currently used glasses, e.g. TA-23 and CABAL-12, with center pins of other materials than molybdenum.

There is a still further need for the development of hermetic glass-to-metal seals for Li-chemistry power supplies using aluminoborate glasses having thermal expansion coefficient ranges of $90–120 \times 10^{-7}/°C$., that are as resistant to attack by lithium and other aqueous and electrolytic solutions as are currently used glasses such as TA-23, and that can be sealed with pin materials other than molybdenum, such as Alloy 52 and 446 stainless steel, using conventional sealing technology.

SUMMARY OF THE INVENTION

In view of the above-described needs, it is an object of this invention to provide glass-to-metal seals for use in lithium electrolyte environments, using glass compositions that seal hermetically with alternative, higher expansion, metal pin materials other than molybdenum.

It is a further object of this invention to provide hermetic glass-to-metal seals for lithium power supplies, using glass compositions that resist lithium corrosion as effectively as previously known glasses and that can be sealed at low temperatures to high expansion metal alloys such as Alloy 52 and 446 stainless steel.

It is still a further object of this invention to provide hermetic glass-to-metal seals for Li-chemistry power supplies, using glass compositions with thermal expansion coefficients in the range of $90–120 \times 10^{-7}/°C$., that are resistant to attack by lithium and seal using conventional sealing technology with alternative high expansion pin materials.

To achieve the foregoing and other objects and in accordance with the purpose of the present invention, as embodied and broadly described herein, there have now been devised new glass-to-metal seals using alkaline earth-aluminoborate ternary or quaternary glass formulations, based on the (CaO, SrO, BaO)—$B_2O_3$—$Al_2O_3$ systems, in various combinations, and high expansion metal pin materials.

The glasses of the invention are certain boroaluminate glasses with SrO and BaO substituted for the CaO and MgO used in CABAL-12, and a new CaO-$B_2O_3$—$Al_2O_3$ glass composition, all having thermal expansion coefficients that match the proposed new pin materials, while maintaining excellent resistance to attack by lithium. By adjusting the composition of these glasses, the thermal expansion coefficient of the glass can be systematically varied between 90 and $120 \times 10^{-7}/°C.$, allowing the glasses to be hermetically sealed to a number of high expansion pin materials. The glasses according to this invention not only meet the three basic criteria for hermetic seals to high expansion alloys for Li-battery applications, but also show distinct advantages over TA-23, CABAL-12, or other previously known glasses.

For instance, these glasses demonstrate better corrosion resistance to Li metal at 150° C. than TA-23 and, in some cases, CABAL-12. Additionally, the glasses of the instant invention melt at lower temperatures than the previously preferred glasses, e.g. all the glasses of the invention melt at about 1200° C., whereas TA-23 is melted at about 1550° C. Also, the glasses of the invention can be sealed to a metal at a lower temperature than is needed to seal the previously known glasses, e.g. around 650°–750° C. as opposed to 1025° C. for TA-23 and 800° C. for CABAL-12. These lower melting and sealing temperatures mean lower manufacturing costs and longer furnace life. Finally, these glasses may be sealed using the alternative metal pin materials of the invention, 446 stainless steel (expansion coefficient of about $114 \times 10^{-7}/°C.$) and Alloy-52 (expansion coefficient of about $98 \times 10^{-7}/°C.$).

Additional objects, advantages, and novel features of the invention will become apparent to those skilled in the art upon examination of the following description of may be learned by the practice of the invention. The objects and advantages of the invention may be realized and attained by means of the instrumentalities and combinations particularly pointed out in the appended claims.

DETAILED DESCRIPTION OF THE INVENTION

In the glass-to-metal seals of the invention, identified glass compositions with the required thermal expansion coefficients are in several alkaline earth boroaluminate glass-forming regions. The general compositions are, in mole %: (40–60) BaO, (30–50) $B_2O_3$, and (10–25) $Al_2O_3$; (40–60) SrO, (35–50) $B_2O_3$, and (10–20) $Al_2O_3$; (40–60) RO, (30–50) $B_2O_3$, and (10–25) $Al_2O_3$, where RO=BaO+SrO+CaO. Specifically preferred glass compositions are six named alkaline earth-aluminoborate ternary systems and two quaternary mixed alkaline earth-aluminoborate system, shown below in Table 1 with their thermal expansion coefficients.

TABLE 1

| Name | Mole % Oxide | | | | | Therm. Expansion (x $1E^{-7}/°C.$) |
|---|---|---|---|---|---|---|
| | CaO | SrO | BaO | $B_2O_3$ | $Al_2O_3$ | |
| BABAL-1C | 30 | — | 20 | 40 | 10 | 101 |
| BABAL-1D | 40 | — | 10 | 40 | 10 | 94 |
| BABAL-1 | — | — | 50 | 40 | 10 | 114 |
| BABAL-2 | — | — | 40 | 40 | 20 | 104 |
| SrBAL-1 | — | 50 | — | 40 | 10 | 102 |
| SrBAL-2 | — | 45 | — | 40 | 15 | 98 |
| SrBAL-4 | — | 40 | — | 50 | 10 | 90 |
| CABAL-17 | 50 | — | — | 30 | 20 | 90 |

These compositions produce glasses not only with good resistance to lithium corrosion, but also with the proper thermal expansion characteristics for sealing to the new high expansion pin materials. Further, these glasses may be prepared using fully conventional melting and forming techniques. Thus, these glasses can be beneficially used for the glass-to-metal seals of this invention, in components exposed to severe chemical environments.

The specifically preferred use for these glass-to-metal seals is as hermetic seals for lithium battery headers. These seals will find applications in battery headers for commercial and military components, among other applications.

Without further elaboration, the following preferred specific embodiments are provided to illustrate some of the properties of the glass-to-metal seals of the invention and to allow one skilled in the art to utilize the present invention to its fullest extent. Therefore, these examples are to be construed as merely illustrative, and not limitative of the remainder of the disclosure in any way whatsoever.

EXAMPLES OF SEAL FABRICATION

The glasses described above, which meet the formability and thermal expansion requirements for sealing to the new, high expansion metal pin materials, have been tested and evaluated. The following are summaries of recent experiments performed in order to determine glass compositions that meet the requirements for the new seals.

Test headers using the new glasses and pin materials have been made. Glass-pin material systems that have been successfully sealed in D-cell battery header configurations, and their sealing temperatures, are shown below in Table 2. These seals were made using the Honeywell D-cell battery header configuration, a standard header for Li-batteries.

TABLE 2

| Glass | Pin | $T_{seal}$ |
|---|---|---|
| BABAL-1 | 446 SS | 615° C. |
| BABAL-1C | Alloy 52 | 670° C. |
| BABAL-1D | Alloy 52 | 680° C. |
| SrBAL-1 and 2 | Alloy 52 | 700° C. |
| CABAL-17 | Alloy-52 | 750° C. |

The glasses used for these tests are low melting and require low temperatures for sealing. The resulting seals were hermetic, with no obvious reaction species or detectable inhomogeneities (i.e. cracks, bubbles, crystallization) at the glass-metal interfaces. The leak rates of all these glass seals are $<10^{-9}$ cc Helium/second at room temperature and 1 atmosphere. All indications are that the new glasses and the new pin metals of the invention are compatible for sealing.

Also, a number of these boroaluminate glasses with the required thermal expansion coefficients have undergone the Li Contact Ampule Test (LiCAT). To qualitatively determine their resistance to attack by Li corrosion, these glasses were contacted with Li metal, and held at 150° C. insealed ampules. In addition, two previously known glasses for glass-to-metal seals, TA-23 and CABAL-12, were chosen for comparison, to illustrate the unexpectedly marked improvement of the glasses of the invention over the prior art. Some of these results are summarized below:

| Name | Formula (mole %) | Days Before Corrosion |
| --- | --- | --- |
| BABAL-1 | $50BaO, 40B_2O_3, 10Al_2O_3$ | >14 |
| BABAL-2 | $40BaO, 40B_2O_3, 20Al_2O_3$ | >30 |
| BABAL-1C | $30CaO, 20BaO, 40B_2O_3, 10Al_2O_3$ | 45 |
| BABAL-1D | $40CaO, 10BaO, 40B_2O_3, 10Al_2O_3$ | 90 |
| SrBAL-4 | $40SrO, 50B_2O_3, 10Al_2O_3$ | 70 |
| TA-23 | $14.16CaO, 11.49MgO, 3.83SrO, 0.4La_2O_3$ $49.54SiO_2, 12.98Al_2O_3, 7.6B_2O_3$ | 3-6 |
| CABAL-12 | $20CaO, 20MgO, 20Al_2O_3, 40B_2O_3$ | 30-60 |

Compared to TA-23, boroaluminate glasses of the invention have far superior Li-corrosion resistance properties to the currently used sealing glasses. For instance, the glass designated BABAL-1C resisted attack for approximately 40 days, compared to a resistance of only 3 days for a similarly tested TA-23 sample. Even CABAL-12 with a resistance of 30-60 days did not compare favorably to BABAL-1D (90 days) and SrBAL-4 (70 days). These results indicate that, in general, tests on the remaining glasses in the Table 1 should reveal an equally superior Li-corrosion resistance.

From the foregoing description, one skilled in the art can easily ascertain the essential characteristics of this invention, and, without departing from the spirit and scope thereof, can make various changes and modifications of the invention to adapt it to various usages and conditions.

We claim:

1. In an ambient temperature lithium battery, the improvement in combination therewith comprising a glass-to-metal seal, comprising:
   (a) a metal selected from the group consisting of an alloy of 50% iron and 50% nickel and 446 SS; and
   (b) a glass consisting essentially of, in mole %:
   RO about 40-60
   $B_2O_3$ about 30-50
   $Al_2O_3$ about 10-25
   where RO may be BaO, SrO, or CaO, or any combination of the three.

2. In an ambient temperature lithium battery, the improvement in combination therewith comprising a glass-to-metal seal, comprising:
   (a) a metal selected from the group consisting of an alloy of 50% iron and 50% nickel; and
   (b) a glass consisting essentially of, in mole %:
   CaO about 30
   BaO about 20
   $B_2O_3$ about 40
   $Al_2O_3$ about 10.

3. In an ambient temperature lithium battery, the improvement in combination therewith comprising a glass-to-metal seal, comprising:
   (a) a metal selected from the group consisting of an alloy of 50% iron and 50% nickel; and
   (b) a glass consisting essentially of, in mole %:
   CaO about 40
   BaO about 10
   $B_2O_3$ about 40
   $Al_2O_3$ about 10.

4. In an ambient temperature lithium battery, the improvement in combination therewith comprising a glass-to-metal seal, comprising:
   (a) a metal selected from the group consisting of 446 SS; and
   (b) a glass consisting essentially of, in mole %:
   BaO about 50
   $B_2O_3$ about 40
   $Al_2O_3$ about 10.

5. In an ambient temperature lithium battery, the improvement in combination therewith comprising a glass-to-metal seal, comprising:
   (a) a metal selected from the group consisting of an alloy of 50% iron and 50% nickel and
   (b) a glass consisting essentially of, in mole %:
   BaO about 40
   $B_2O_3$ about 40
   $Al_2O_3$ about 20.

6. In an ambient temperature lithium battery, the improvement in combination therewith comprising a glass-to-metal seal, comprising:
   (a) a metal selected from the group consisting of an alloy of 50% iron and 50% nickel; and
   (b) a glass consisting essentially of, in mole %:
   SrO about 50
   $B_2O_3$ about 40
   $Al_2O_3$ about 10.

7. In an ambient temperature lithium battery, the improvement in combination therewith comprising a glass-to-metal seal, comprising:
   (a) a metal selected from the group consisting of an alloy of 50% iron and 50% nickel; and
   (b) a glass consisting essentially of, in mole %:
   SrO about 45
   $B_2O_3$ about 40
   $Al_2O_3$ about 15.

8. In an ambient temperature lithium battery, the improvement in combination therewith comprising a glass-to-metal seal, comprising:
   (a) a metal selected from the group consisting of an alloy of 50% iron and 50% nickel; and
   (b) a glass consisting essentially of, in mole %:
   SrO about 40
   $B_2O_3$ about 50
   $Al_2O_3$ about 10.

9. In an ambient temperature lithium battery, the improvement in combination therewith comprising a glass-to-metal seal, comprising:
   (a) a metal selected from the group consisting of an alloy of 50% iron and 50% nickel; and
   (b) a glass consisting essentially of, in mole %:
   CaO about 50
   $B_2O_3$ about 30
   $Al_2O_3$ about 20.

* * * * *